Nov. 1, 1927.
R. B. POLLOCK
1,647,663
SIGNALING APPARATUS
Filed March 2, 1920
2 Sheets-Sheet 1
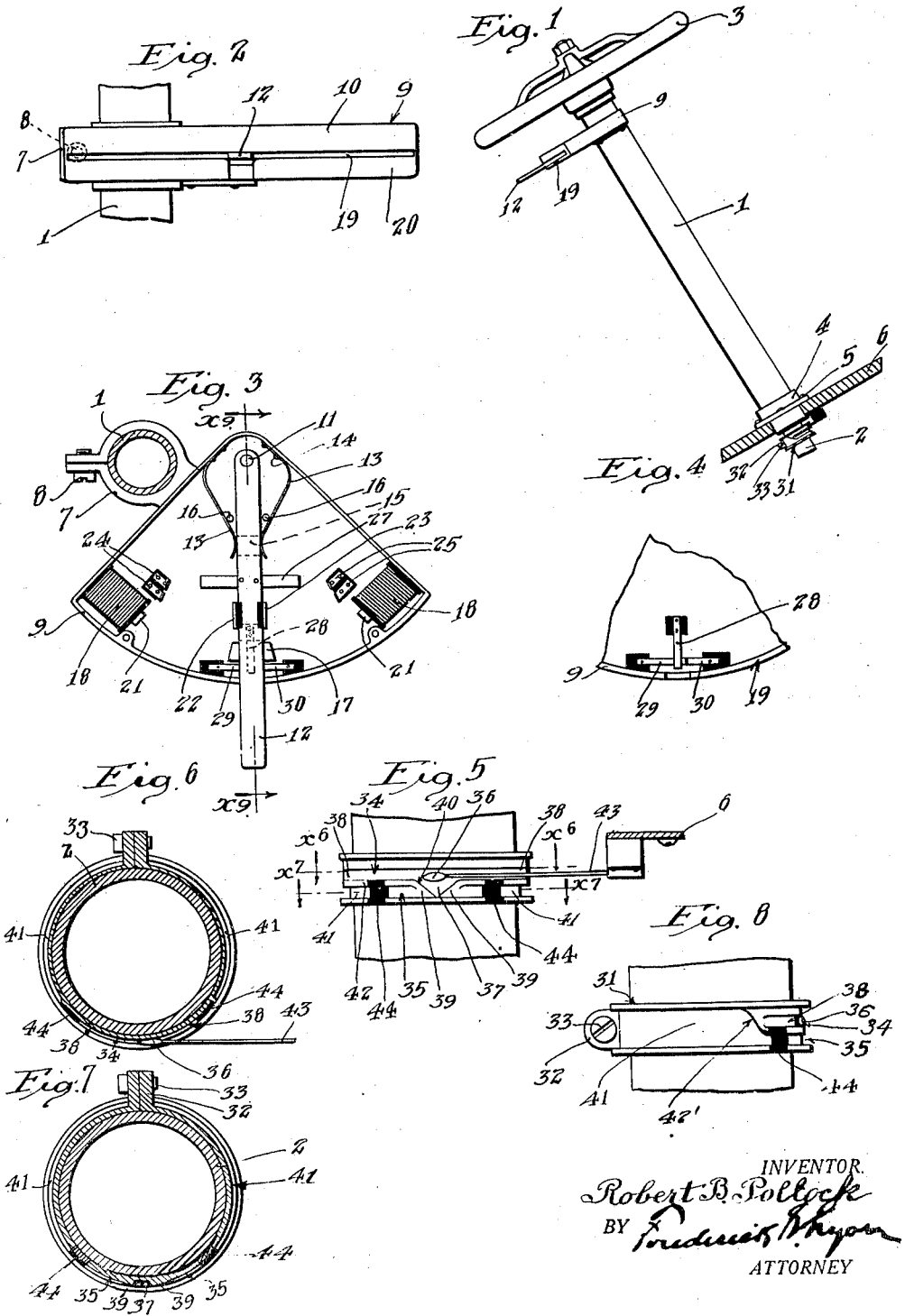
INVENTOR.
Robert B. Pollock
BY
ATTORNEY Nov. 1, 1927.                 R. B. POLLOCK                 1,647,663
                           SIGNALING APPARATUS
                          Filed March 2, 1920          2 Sheets-Sheet 2
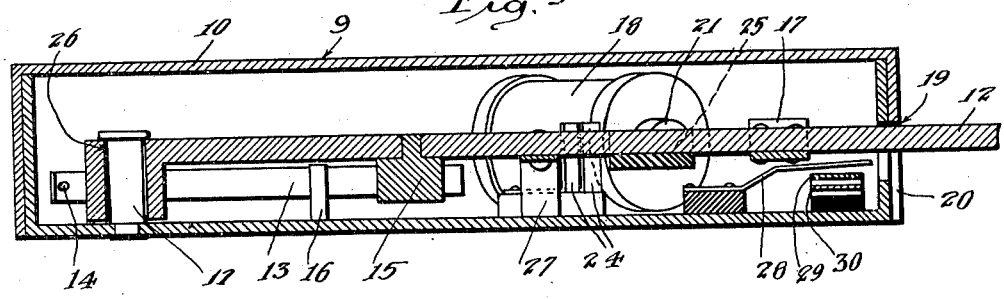
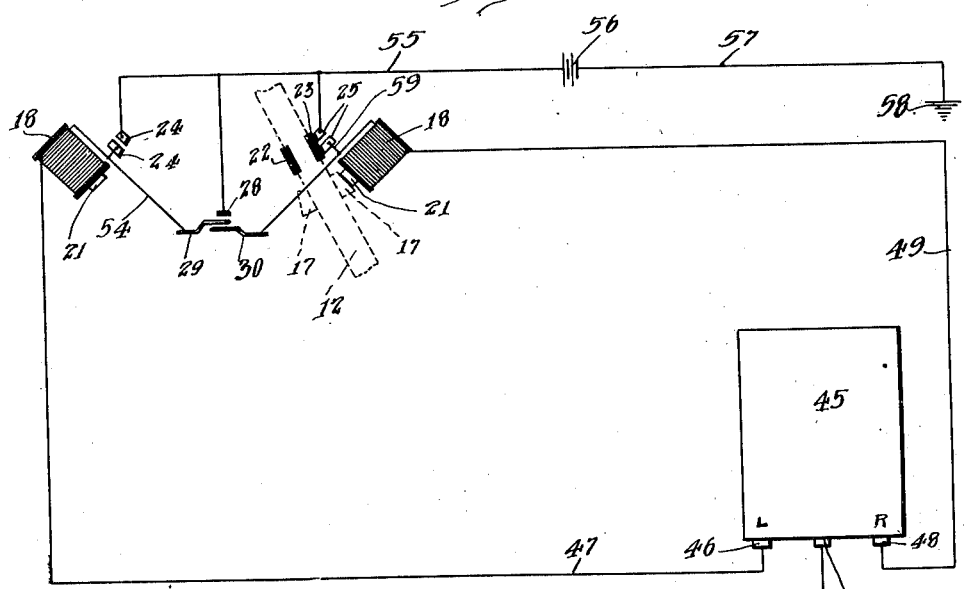
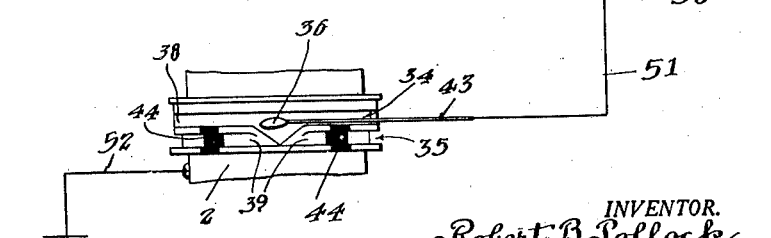
INVENTOR.
Robert B Pollock
BY
ATTORNEY Patented Nov. 1, 1927.

1,647,663

UNITED STATES PATENT OFFICE.

ROBERT B. POLLOCK, OF LOS ANGELES, CALIFORNIA.

SIGNALING APPARATUS.

Application filed March 2, 1920. Serial No. 362,732.

This invention relates more particularly to means for electrically controlling a direction signal, and an object of the invention is to so construct the apparatus that the signal will be exhibited during the turning movement of the vehicle and will then be automatically reset to non-signaling condition by turning of the steering apparatus in a direction to straighten out the dirigible wheels of the vehicle.

Another object is to provide for manual operation to signaling position of an operating member previous to the beginning of the turning movement of the vehicle and for holding said member in such position and for automatic release of the manual control member by turning of the steering mechanism in a direction opposite to that which causes the turning movement of the vehicle.

Another object is to provide for comparative simplicity of construction and for durability and reliability in operation of the apparatus.

Other objects and advantages will appear hereinafter.

The accompanying drawings illustrate the invention:

Figure 1 is a side elevation of a construction embodying the invention.

Fig. 2 is an enlarged rear view of the manually operated switch, a fragment of the steering column also being shown.

Fig. 3 is a plan view of Fig. 2 with the cover removed.

Fig. 4 is a fragmentary view of the lower portion of Fig. 3 with the switch arm omitted so as to clearly show the electric contacts therebeneath.

Fig. 5 is an enlarged side elevation of the switch operated by the steering shaft, a portion of said shaft also being shown.

Fig. 6 is a plan section on line indicated by $x^6-x^6$, Fig. 5.

Fig. 7 is a plan section on line indicated by $x^7-x^7$, Fig. 5.

Fig. 8 is an elevation from the left of Fig. 5.

Fig. 9 is an enlarged vertical section on line indicated by $x^9-x^9$, Fig. 3 with the cover in place.

Fig. 10 is a diagram of electrical connections, the signaling device being also indicated.

A steering device is partly indicated in Fig. 1 and in said figure the elements of said device are a tubular post 1, a shaft 2 extending through the post, and the wheel 3 by which the shaft is turned in a manner well understood in the art pertaining to steering devices. The post 1 is secured by a flange 4 and screws 5 to the footboard 6 of the vehicle. The construction just described may be found on almost all motor vehicles, and therefore, requires no more detailed description herein. Secured by a split sleeve 7 and screw 8 to the post 1 is a switch case 9, the cover thereof being indicated at 10. The sleeve 7 supports the case 9 in convenient position beneath the steering wheel 3, but it is understood that the case may be otherwise positioned if desired.

Pivoted at 11 inside of the case 9 is a manually operative control member 12 in the form of an arm and this arm is normally held in mid position in the case 9 by springs 13 fastened at 14 to the case, and having their free ends resting against an abutment 15 of the arm 12, said abutment extending downwardly as clearly shown in Fig. 9 of the drawings. When the arm 12 is in mid position, which is the neutral or non-signaling position, the springs 13 have their inner faces resting against stops 16 projecting upwardly from the bottom of the case 9 into the path of travel of the springs so that if, as might happen, the springs 13 are of different strengths the arm 12 will not be pushed by the stronger spring beyond its mid position.

The arm 12 is provided with an armature 17 projecting beyond the longitudinal edges of the arm so that, when said arm is swung to one side or the other, it will engage one of a pair of electro-magnets 18 which are mounted in the front corners of the case 9 at opposite sides of the arm 12. The arm 12 is sufficiently long to project through a slot 19 in the front wall 20 of the case so that the driver may readily grasp the projecting end of the arm with his hand to manipulate the same. When the arm 12 is operated to move the armature 17 into engagement with the core 21 of either of the electro-magnets, one of a pair of electric contacts 22, 23, projecting and insulated from the longitudinal edges of the arm 12, engages a pair of spaced spring electric contacts 24 or 25, as the case may be, mounted on and insulated from the bottom of the case 9 and arranged on opposite sides of the arm.

The arm 12 is so constructed that its free end may be depressed to some degree and this may be effected by making the arm sufficiently thin and of spring material so that it may be readily flexed downwardly. Also, if desired, the hole 26 of the arm, through which the pivot 11 projects, may be of slightly larger diameter than the pivot, as shown in Fig. 9, so as to make a loose fit and thus enable the arm 12 to be raised and lowered to some extent at its free end, even though the arm be of material other than that having spring quality. Whatever the construction of the arm 12, the free end thereof will normally be held in raised position by suitable means such, for example, as a bow-shaped spring 27 fastened near its middle to the under face of the arm 12 so that the outer ends of said spring rest upon the bottom of the case 9 and ride upon said bottom when the arm is swung to one side or the other.

When the arm 12 is in mid position and is thus held in raised position by the spring 27 it is free from engagement with a spring electric contact 28 mounted just beneath the arm upon the bottom of the case and insulated from said case; but when the arm 12 is depressed by the operator it engages the spring contact 28 and depresses said contact into engagement with a second spring electric contact 29 also mounted on and insulated from the case 9. When the arm 12 is depressed still further it causes the contact 29 to engage a third spring electric contact 30 also mounted on and insulated from the bottom of the case. The contacts 28, 29 and 30 are normally spaced from one another and only engage when the arm 12 is depressed while in mid position to produce that effect.

Mounted on the steering shaft 2 at any convenient portion thereof, and in this instance just beneath the lower end of the post 1, is a metal collar 31 which may be in electrical contact, and thus grounded, with the steering shaft 2. The collar, in the instance shown, is split and is provided with ears 32 through which passes a screw 33 for the purpose of securely binding the collar in place on the shaft. The collar 31 is provided with two circumferentially extending ways, an upper way 34 and a lower way 35, and these ways are of such construction as to cause an electric contact 36 to ride in the way 34 when the shaft 2 is turned from the straight-ahead position, shown in Fig. 5, to right or left turning positions; and to cause the contact 36 to ride in the way 35 when the shaft is turned to the straight-ahead position after such first turning. The first described turning movement, of course, deflects the dirigible wheels of the vehicle from a straight-ahead course to steer the vehicle to one side or the other, and the second described movement of the shaft returns the wheels to straight-ahead position after the turn is effected so as to cause the vehicle to pursue a straight course.

The ways 34, 35 may be constructed as follows: The way 34 is provided with a lower area 37 adapted to engage the contact 36 when the shaft 2 is in straight-ahead position and said way 34 gradually slopes to higher areas 38 at both sides of the lower area. Also the way 35 is provided with higher areas 39 adjacent the lower area 37 so as to form shoulders 40 which extend aslant downwardly toward each other. Also the way 35 slopes from the higher areas 39 to lower areas 41 at both sides of the higher areas, said lower areas 41 being adjacent the high areas 38 and there being shoulders 42 extending circumferentially of the collar from the shoulders 40 and terminating at their outer ends in upwardly slanting portions 42'. It is obvious that, if the shaft be turned from the position shown in Fig. 5, one of the shoulders 40 and then the adjacent shoulder 42 will ride against the contact 36 and deflect the same until shoulder 42' rides beneath said contact, thus shifting the contact 36 into the way 35. If the shaft 2 now be turned in a reverse direction the shoulder 42 will hold the contact 36 in the way 35 until the shaft is turned to substantially the mid position, whereupon the contact 36 will ride over the shoulder 40 into the way 34 and assume the position shown in Fig. 5. It is understood that, to effect this operation, the contact 36 is yieldingly held in engagement with the collar 31 and, in this instance, to effect this the contact 36 is mounted on one end of a spring 43 which has its other end fixed to a suitable support, such support being provided, in the drawings, by the footboard 6.

The way 35 is provided at either side of the higher areas 39 with insulation inserts 44 and it is thus clear that the collar 31 and contact 36 will be in electrical engagement with one another at all times, excepting when the insulation inserts 44 engage the contact 36, and this of course occurs when the shaft is being returned from the vehicle-turning position to the straight-ahead position.

I will now describe one way in which the apparatus above described may be electrically connected with direction indicators or signals, to effect operation of said signals when the driver of the vehicle, on which the apparatus is installed, desires to indicate that he is going to stop or turn it. In Fig. 10 is indicated signaling means 45 of any desired construction. These signaling means may be, for example, a pair of signals of the construction shown in my co-pending application for patent, Serial No. 260,976, filed Nov. 4, 1918, or said signaling means may merely consist of a pair of incandescent lamps adapted to be illuminated by the electric current controlled by the above described apparatus. It is understood that it matters not what the construction of the direction indicators be, or how the electrical connections are made therewith, and that the connections shown in Fig. 10 are merely illustrative, and do not in any way limit the scope of the invention, since any other system of wiring may be employed, consistent with the convenience of the constructor and with the results which it is desired to obtain.

In Fig. 10 the left turn terminal 46 of the signaling means 45 is connected by a wire 47 to the electro-magnet 18 on the left, and the right turn terminal 48 of the signaling means is connected by a wire 49 to the right electro-magnet. The center or common return terminal 50 of the signal 45 is connected by a wire 51 to the spring 43 and the shaft 2 is connected by a wire 52 to a suitable ground 53. The electro-magnet on the left is connected by a wire 54 to the contact 29 and also to one of the contacts 24. The other contact 24 is connected by a wire 55 to a source 56 of electric current, said source being connected by a wire 57 to a ground 58. The wire 55 also connects to the contact 28 and to one of the contacts 25. The other contact 25 is connected by a wire 59 to the electro-magnet 18 at the right and also to the contact 30.

The invention operates as follows:

Assume, for example, that the driver of the vehicle on which the invention is installed desires to turn to the right. He will first indicate to others that he is going to make a right turn by moving the arm 12 to the right, thus engaging the contact 23 with the contacts 25 and thereby establishing a circuit through the right hand electro-magnet 18 which thereupon functions to hold the armature 17 and the arm. This established circuit is that which effects display of the right turn signal. After the driver has thus moved the arm 12 to the right to make the signal, the signal will be displayed until he has finished making the turn, unless he should first manually operate the arm 12 to retract it to the mid position shown in Fig. 3. After thus causing the right turn signal to be displayed, he may turn the steering wheel 3 to the right to effect the turn and the contact 36 will ride in the way 34 until the shoulder 42' rides beneath the contact 36. The circuit is unbroken during this turning of the steering wheel. After making the turn, the driver will of course turn the wheel 3 to the left so as to cause reverse rotation of the shaft 2, thus laying the course of the vehicle straight-ahead and also causing the electric contact 36 to ride in the way 35. During the reverse rotation of the shaft 2 the insulation 44 will cause a momentary break in the electric circuit. This in turn de-energizes the electro-magnet, holding the armature 17, for a sufficient length of time to allow the appropriate spring 13 to retract the arm 12 to its mid position. As soon as the circuit is thus broken the energization of the direction signal 45 will cease and consequently it will be placed in the non-signaling condition.

If the driver desires to turn to the left he will proceed in the same way as above described, excepting that he will move the arm 12 to the left and follow that by turning the steering wheel to the left. In such event the left hand signal will be energized until he turns the wheel in the reverse direction to direct the vehicle straight ahead.

If the driver desires to indicate that he intends to stop the vehicle, he will depress the forward end of the arm 12 so as to cause the contacts 28, 29 and 30 to engage one another, thus establishing circuits through both left and right turn signals to place the signal in the condition signaling "Stop."

The invention is not limited to the exact details of construction shown in the drawings and described above, but such changes and modifications may be made therein as lie within the spirit and scope of the appended claims.

The arm 12, contacts 22, 23, 24, 25, 28, 29 and 30 constitute a manually operated triple make-and-break device or switch, and the collar 31, insulation 44 and contact 36 constitute an automatically operated make-and-break device or switch.

I claim:

1. In a signaling apparatus, electrically operated direction signals, electric circuits for effecting energization of said signals to indicate a turn to the right and left, said circuits including manually operative make-and-break means comprising a movable member and electro-magnets to hold the movable member in circuit closing positions, and the circuits also including make-and-break means operative by turning of the steering gear in a direction reverse to that effecting the turn after the indicated turn is made to break the circuit.

2. In a signaling apparatus, electrically operated direction signals, electric circuits for effecting energization of said signals to indicate a turn to the right and left, said circuits including manually operative make-and-break means comprising a movable member and means to hold the movable member in circuit closing positions, and means operative by turning of the steering gear in a direction reverse to that effecting the turn after the indicated turn is made to release the movable member.

3. In a signaling apparatus, a vehicle, a pair of electrically operated signals for indicating a turn to the right and a turn to the left respectively, a separate circuit for each signal, manually operable means for selectively closing said circuits in advance of making the turn including a member movable from a normally open circuit position to two circuit closing positions, electromagnetic holding means in each of said circuits for maintaining said movable member in circuit closing position when so moved, means operated by movement of the steering mechanism of said vehicle to make the turn for deenergizing said holding means, and means for returning said movable member to said normal position.

Signed at Los Angeles, California, this 21st day of February, 1920.

ROBERT B. POLLOCK.